Patented July 5, 1938

2,122,958

UNITED STATES PATENT OFFICE 2,122,958

AROMATIC SULPHONES AND TANNING AGENTS

Josef Schäfer, Basel, Switzerland, assignor to J. R. Geigy A. G., Basel, Switzerland No Drawing. Application August 10, 1936, Serial No. 95,283. In Germany August 14, 1935

10 Claims. (Cl. 260—158)

Within recent years there have become known from the work of Meyer (Annalen 433, pages 366 et seq.) and of Zehenter and Gosch (Journal pr. Ch. 1929, pages 276 et seq.) methods for preparing simple and mixed sulphones which have for the first time made the whole class of sulphones easily available in the laboratory. Nevertheless these processes are not entirely free from objection. Zehenter states that under the most favourable experimental conditions there were obtained red-brown reaction masses, and that otherwise resinification easily occurred. The sulphones which this investigator always obtained more or less coloured are invariably accompanied by larger or smaller quantities of resin. The process of Meyer also frequently yields resinous by-products, for example in the reaction of toluene vapours on para-phenol-sulphonic acid there is obtained besides a soluble fraction a dark red resin which is characterized as a phenol resin of the kind described in German specification No. 260,379. These coloured products can be purified only with considerable difficulty, and repeated recrystallization generally does not lead to completely colourless products.

According to this invention, the commercial preparation of sulphonated or unsulphonated aromatic sulphones containing at least one hydroxyl-group and at least one —$SO_2$— bridge can be considerably improved by subjecting quite generally a mixture of a sulphonic acid of an aromatic hydrocarbon, of a phenol or of a phenol ether with a phenol or a derivative thereof, especially a sulphone, to reaction below atmospheric pressure. In this manner it is possible, on the one hand, to prepare without difficulty certain sulphones which commercially were not accessible by hitherto known processes, whilst, on the other hand, the process offers the advantage that owing to the relatively mild course of reaction it yields directly very light reaction products without the necessity for a subsequent purification. The preparation of mono-sulphones can indeed be conducted below atmospheric pressure at substantially lower temperatures; the higher the vacuum the more can the temperature be reduced. The process offers the further advantage that the reaction-water and the phenol which has not reacted can be removed from the melt continuously and very quickly, so that those influences which must be considered mainly responsible for decompositions are excluded. Dark-coloured decomposition products or by-products do not occur at all in the case of mono-sulphones, and occur only in inappreciable quantities in the production of sulphones containing more than one sulphone group in the molecule. This difference is due no doubt to the higher temperature which is required in the latter case.

It may also be mentioned that the formation of the sulphones proceeds considerably more rapidly in the process of the invention than when no reduced pressure is used.

For the manufacture of sulphones in accordance with the present invention it is generally unnecessary to start with an isolated aromatic sulphonic acid, but one may start with advantage directly from the crude sulphonation mixture still containing free sulphonating agent. If it is desired to obtain directly sulphonic acids of oxyaryl-sulphones one may either start from an aromatic disulphonic acid, or may add further sulphonating agent to the monosulphonic acid, in which case sulphonation and the formation of the sulphone proceed simultaneously.

It is also possible to conduct the manufacture of the sulphones in presence of an inert diluent of high boiling point, for example ortho-dichlorobenzene, or in presence of a flux which at the reaction temperature selected does not enter into reaction. The diluent or flux may serve, for example, for maintaining the melt fluid, and so far as it is volatile it may also serve wholly or in part to assist the rapid removal of the reaction water from the melt.

The yield depends greatly on the equilibrium which is attained with the particular reaction components and reaction conditions. It is thus possible to influence the equilibrium conditions as may be desired by alteration of the temperature and of the vacuum.

The sulphones obtainable in accordance with the invention are useful for various purposes, for example as wetting agents, agents for combating pests, auxiliary substances for use in tanning, and so on, and as intermediate products for the manufacture of such agents. They are also useful for the manufacture of dyestuffs.

The following examples illustrate the invention, the parts being by weight:—

Example 1

392 parts of sulphuric acid monohydrate are slowly added at 40° C., to 376 parts of molten phenol, after which the hole is heated at 100°–110° C. for half to one hour. To the sulphonic acid thus prepared molten phenol is added slowly through a capillary tube at 120°–130° C. at a 15 to 18 m./m. pressure. It is advantageous to introduce the phenol in such a manner that it has to follow as long a course as possible through the reaction mass in order that it may not be evaporated wholly or in part before it can enter into reaction. The water formed in the reaction distils and carries with it some phenol which is separated and used again. The control of the reaction water offers a good possibility for observing the progress of the formation of the sulphone.

When in the course of 2-3 hours about 250 parts of phenol have been added, dihydroxydiphenyl-sulphone begins to crystallize. The reaction water distils, about 1 part of phenol being carried over with each 4 parts of water. The addition of phenol can be continued for some time. When the melt has become so viscous that it is no longer possible to ensure proper admixture, the sulphone formation is interrupted, the reaction mass is diluted with the required quantity of water, and the insoluble sulphone formed is separated from the unaltered phenolsulphonic acid.

This sulphonic acid is evaporated in a vacuum and used for the formation of further sulphone. The reaction product is obtained in a yield of 50 per cent. calculated on the phenolsulphonic acid; it is very light in colour, no darkly coloured by-products being formed in the reaction.

The yield is mainly dependent on the viscosity of the melt. As soon as this increases to such an extent that no thoroughly mixing results from the addition of phenol the reaction ceases. A suitable inert solvent may be added as a diluent; however, owing to the sparing solubility of the sulphones and the particular reaction conditions, the practical possibilities are very limited. The same is attained more satisfactorily by the addition of a flux. For this purpose there are suitable sulphonic acids of hydrocarbons, such as naphthalene-sulphonic acids, or tetrahydro-naphthalene-sulphonic acids, or toluene-sulphonic acids, which react with difficulty or not at all at the low temperature used. Owing to the fact that the melt then becomes more liquid, the formation of sulphone is resumed.

Example 2

392 parts of sulphuric acid monohydrate are allowed to run slowly into 432 parts of molten ortho-cresol at 40° C. and the whole is then heated for half to one hour at 100°-110° C. The further procedure is then as described in Example 1, the molten ortho-cresol being allowed to drop in slowly below atmospheric pressure. 4:4'-dihydroxy-3:3'-dimethyldiphenyl - sulphone is obtained in a yield of 50 per cent. calculated on the sulphuric acid used and in very good purity. The molten liquor containing the remaining unconsumed ortho-cresol-sulphonic acid is concentrated and used in a further batch.

Example 3

348 parts of oleum of 66 per cent strength are added slowly to 432 parts of meta-cresol whilst cooling, and the mixture is then heated for 1 hour at 110° C. Meta-cresol is then added, drop by drop, below atmospheric pressure at 140°-150° C. to the meta-cresol-sulphonic acid thus formed in the manner described above. After the addition of about 450 parts of meta-cresol the homogeneous mass is allowed to cool somewhat and sufficient water is added to cause separation into two layers. The diluted sulphonic acid layer is separated, concentrated below atmospheric pressure and used again for the reaction. The remaining sulphone solidifies after a short time in the cold to a crystalline magma.

If instead of meta-cresol in the above example the equivalent quantity of para-cresol is used, the process proceeds in exactly the same manner and there is obtained as final product the sulphone from para-cresol in an excellent yield.

Example 4

The procedure is as described in Example 1, except that instead of phenol the equivalent quantity of ortho-cresol is run into the sulphonation mixture prepared from phenol and monohydrate. There is obtained as final product the mixed sulphone in an excellent yield; it constitutes a thick viscous mass which does not crystallize even after standing for a long time.

Instead of the components above described one may of course also make use of all possible variations in the phenol sulphonic acid and in the phenol. There are thus obtained mixed sulphones having similar properties.

Example 5

200 parts of crude cresol consisting of a mixture of ortho-, meta- and para-cresol are added gradually through a capillary tube within 3 to 4 hours at 120°-125° C. and at a 15 to 18 m/m. pressure to 800 parts of a sulphonation mixture prepared by the customary process from crude cresol consisting of a mixture of ortho-, meta- and para-cresol and a sulphonating agent. The reaction conditions are so selected that the reaction ceases when cresol-sulphonic acids and dihydroxyditolyl-sulphones are present in the reaction mixture in a desired proportion, here in equal molecular parts, which may easily be determined by control of the water liberated by the reaction or simply by determination of the variation of acidity by titration. The reaction water distils and about 25 parts of crude cresol are recovered and may be reintroduced.

If importance is attached to obtaining as large a yield of sulphone as possible, one proceeds exactly as above indicated but runs in twice the quantity of crude cresol. The sulphone is then obtained in a yield of 70-80 per cent. of the theoretical. The yield may be further increased by the use of a lower pressure.

The simple or mixed sulphones described in the foregoing five examples may serve, among other purposes, as intermediate products for the manufacture of tanning agents according to the processes of U. S. A. Patents Nos. 1,901,536, 1,972,574 and 1,988,985. In the latter case the sulphone formation should not be carried as far as possible, but the reaction should be interrupted as soon as the ratio of sulphone to phenolsulphonic acid is that which is desired for the condensation to a tanning agent, and the whole reaction mass is then treated without any purification. Tanning agents are thus obtained having properties resembling those of the known agents. Both the agents and the leather prepared with them are generally distinguished, however, by a lighter colour which may be attributed to the milder conditions under which the sulphones are made. The mixed sulphones obtained from the commercial mixtures of cresols are also valuable owing to its very good solubility in aqueous solutions of phenolsulphonic acid, in consequence of which the condensation with formaldehyde can be conducted at a higher concentration and temperatures of 50°-60° C.; this is of great advantage owing to the tendency of phenolsulphonic acids to decompose in boiling acid solution.

Example 6

Dicresylglycolether-disulphonic acid is first prepared by sulphonating 240 parts of dicresylglycolether with 220 parts of sulphuric acid monohydrate for 2 hours at 100°-110° C. Then 190 parts of amylphenol are run slowly into the sulphonation mixture at 120°–130° C. under the conditions indicated in Example 1. 35–40 parts of amylphenol are carried away with the reaction water and recovered.

At the end of the reaction there is finally obtained the monosulphonic acid of the mixed sulphone from 1 molecular proportion each of amylphenol and dicresylglycolether-disulphonic acid in the form of a light viscous mass. The last residues of the amylphenol can be removed by steam distillation after the mass has been brought to a suitable alkalinity. The reaction product has already good wetting properties and may be used, among other purposes, as an intermediate product for the manufacture of wetting agents.

Instead of amylphenol there may be used the corresponding quantity of phenol or of a cresol.

*Example 7*

120 parts of dicresylglycolether are sulphonated with 110 parts of sulphuric acid monohydrate for 2 hours at 105°–110° C. and then 80 parts of ortho-chlorophenol are added, drop by drop, to the crude sulphonation mixture below atmospheric pressure. 15 parts of ortho-chlorophenol are recovered. Instead of ortho-chlorophenol there may be used the equivalent quantity of 2:4-dichlorophenol, but in this case the yield is somewhat lower.

*Example 8*

250 parts of naphthalenemonosulphonic acid of 100 per cent. strength in the form of the crude sulphonation mixture, 125 parts of dihydroxydiphenylsulphone and 46 parts of sulphuric acid of 100 per cent. strength are heated together for 10 hours at 160°–170° C. below atmospheric pressure, the pressure being 15 mm. The reaction mass is then cooled and poured into water in which the sulphonated reaction product dissolves without giving a precipitate. By bringing the whole to a suitable dilution and neutralizing it, there is obtained a liquor which can be used for tanning directly or, if required, after it has been subjected to an after-treatment with formaldehyde.

Instead of naphthalenemonosulphonic acid there can be used the corresponding quantity of tetrahydronaphthalenesulphonic acid or naphthalene-disulphonic acid, but in the latter case the addition of sulphuric acid must be omitted. Condensation products with similar properties are thereby obtained. Phenolsulphonic acids, on the contrary, give products whose tanning properties are not very pronounced. They can be worked up into tanning substances by further condensation by the usual methods, for example with formaldehyde and aromatic hydroxy-compounds. Instead of dihydroxy disulphone there may be employed other sulphones obtained from homologue phenols and their mixtures.

*Example 9*

120 parts of dicresylglycolether prepared from crude cresol are sulphonated with 110 parts of sulphuric acid of 100 per cent. strength for 2 hours at 100°–110° C. 125 parts of dihydroxydiphenylsulphone are added and the whole is then subjected to condensation for 8 hours at 140° C. below atmospheric pressure in which the pressure amounts to 15 mm. The tanning properties of the solution after dilution and neutralization correspond with those of the product of Example 8.

The tanning substances described in Examples 8 and 9 contain no —$CH_2$— bridge, and their ring systems are combined only by —$SO_2$— groups. It is thus possible to save expensive formaldehyde and to use in its place the cheaper sulphuric acid. Besides a reduction in the cost, this also results in an increase of the fastness to light. The other properties are just as good as those of the corresponding formaldehyde condensation products from aromatic sulphonic acids and sulphones.

It results from the foregoing that the vacuum plays an important part in the operative reaction. Preferably a vacuum of 10 to 25 mm. pressure of mercury will be recommendable without, however, being limited to this range.

What I claim is:—

1. In a process of producing aromatic sulphones containing at least one hydroxyl-group and one —$SO_2$— bridge by reacting a sulphonic acid of a body selected from the group of aromatic hydro-carbons, monohydric phenols and their phenol ethers with one of the class consisting of monohydric phenols, including sulphones, the improvement which consists in carrying out such reaction below atmospheric pressure, substantially at 10 to 25 m/m.

2. In a process of producing aromatic sulphones containing at least one hydroxyl-group and one —$SO_2$— bridge by reacting a disulphonic acid of a body selected from the group of aromatic hydro-carbons, monohydric phenols and their phenol ethers with one of the class consisting of monohydric phenols, including sulphones, the improvement which consists in carrying out such reaction below atmospheric pressure, substantially at 10 to 25 m/m.

3. In a process of producing aromatic sulphones containing at least one hydroxyl-group and one —$SO_2$— bridge by reacting in the presence of a sulphonating agent a sulphonic acid of a body selected from the group of aromatic hydro-carbons, monohydric phenols and their phenol ethers with one of the class consisting of monohydric phenols, including sulphones, the improvement which consists in carrying out such reaction below atmospheric pressure, substantially at 10 to 25 m/m.

4. A process for the production of an aromatic sulphone containing at least one hydroxyl-group and one —$SO_2$— bridge, which comprises reacting a crude monosulphonation mixture of a monohydric phenol and a sulphonating agent with a monohydric phenol below atmospheric pressure, substantially at 10 to 25 m/m.

5. A process for the production of an aromatic sulphone containing at least one hydroxyl-group and one —$SO_2$— bridge, which comprises reacting a crude monosulphonation mixture of a crude cresol consisting of ortho-, meta- and para-cresol and a sulphonating agent with a monohydric phenol below atmospheric pressure, substantially at 10 to 25 m/m.

6. A process for the production of an aromatic sulphone containing at least one hydroxyl-group and one —$SO_2$— bridge, which comprises reacting a crude sulphonation mixture of naphthalene and a sulphonating agent with a monohydric phenol below atmospheric pressure, substantially at 10 to 25 m/m.

7. A process for the production of a dicresylsulphone, which comprises reacting a crude monosulphonation mixture of a crude cresol, consisting of ortho-, meta- and para-cresol, and a sulphonating agent with the same crude cresol below atmospheric pressure, substantially at 10 to 25 m/m.

8. A process for the production of a diphenylsulphone, which comprises reacting a crude monosulphonation mixture of phenol and a sulphonating agent with phenol below atmospheric pressure, substantially at 10 to 25 m/m.

9. A process for the production of a naphthalene-phenylsulphone, which comprises reacting a crude sulphonating mixture of naphthalene and a sulphonating agent with a dihydroxydiphenylsulphone below atmospheric pressure, substantially at 10 to 25 m/m.

10. A process for the production of a naphthalene-phenylsulphone, which comprises reacting a crude monosulphonation mixture of naphthalene and a sulphonating agent with a dihydroxydiphenylsulphone below atmospheric pressure, substantially at 10 to 25 m/m.

JOSEF SCHÄFER.